United States Patent [19]
Kawase

[11] Patent Number: 5,743,761
[45] Date of Patent: Apr. 28, 1998

[54] ELECTRICAL CONNECTOR

[75] Inventor: Hajime Kawase, Yokkaichi, Japan

[73] Assignee: Sumitomo Wiring Systems, Ltd., Yokkaichi, Japan

[21] Appl. No.: 636,694

[22] Filed: Apr. 23, 1996

[30] Foreign Application Priority Data

| Apr. 24, 1995 | [JP] | Japan | 7-124441 |
| Apr. 24, 1995 | [JP] | Japan | 7-124442 |
| Aug. 3, 1995 | [JP] | Japan | 7-219697 |

[51] Int. Cl.$^6$ ............................................. H01R 13/40
[52] U.S. Cl. ............................................. 439/595
[58] Field of Search ............................. 439/595, 752

[56] References Cited

U.S. PATENT DOCUMENTS

| 5,085,599 | 2/1992 | Maejima et al. | 439/595 |
| 5,316,504 | 5/1994 | Jinno | 439/595 |
| 5,326,287 | 7/1994 | Hamakita et al. | 439/595 |
| 5,464,356 | 11/1995 | Nebeshima et al. | 439/752 |

FOREIGN PATENT DOCUMENTS 57-135133  8/1982  Japan .

*Primary Examiner*—Neil Abrams
*Assistant Examiner*—T. C. Patel
*Attorney, Agent, or Firm*—Oliff & Berridge

[57] ABSTRACT

A connector includes a connector housing and a retainer, which can be moved from a temporarily secured position to a fully secured position in the connector housing. The retainer secures a terminal in the connector housing and cannot be erroneous moved into the fully secured position. The connector comprises a connector housing with a retainer insertion hole in a front surface, which reaches flexibly deformable spaces of lances provided in cavities. The retainer is inserted into the retainer insertion hole and held in a temporarily secured position. After a terminal member is inserted into the housing, the retainer is further pushed into the retainer insertion hole and moved to a fully secured position, which restricts flexible deformation of the lances. The direction that the retainer is moved into the temporarily secured position is generally at right angles to the direction the retainer is moved from the temporarily secured position to the fully secured position.

24 Claims, 13 Drawing Sheets

ELECTRICAL CONNECTOR

BACKGROUND OF THE INVENTION

1. Field of the Invention

The invention relates to a connector that can doubly secure terminal members in a connector housing. The connector comprises a retainer mounted in the connector housing, where the retainer can be moved in a reciprocating manner with respect to connector housing to secure the terminal member. The invention also provides for a method for manufacturing the connector, a molding device for manufacturing the connector, and a method for mounting the retainer in the connector housing.

2. Description of Related Art

A conventional connector or front retainer-type connector secures a terminal member in a double manner by pushing a retainer into a connector housing from the front surface. This conventional front retainer-type connector will now be described below with reference to FIGS. 26 and 27.

A connector housing a has an interior with a plurality of cavities c, which receives a metal terminal member b. The terminal member b is inserted into the connector housing from a backside. In the bottom surface of the connector housing a, a plurality of flexible lances d are provided. The lances d are each engageable with a corresponding terminal member b. In the front surface of the connector housing a, a retainer insertion hole e is formed. A retainer g can be mounted into the insertion hole e. The retainer g includes an insertion portion h that is insertable into flexibly deformable spaces f formed in each lance d.

As the retainer g is inserted into the retainer insertion hole e in the connector housing a, the retainer g is initially held at a shallow insertion depth in a temporarily secured position, shown by a solid line in FIG. 26. In the temporarily secured position, the insertion portion h of the retainer g is in front of the flexibly deformable spaces f for each lance d. Therefore, if the terminal member b is inserted into the cavities c, it will deform the lance d. When the terminal member b is inserted to its normal or fully inserted position, each lance d is elastically deformed and returns to the original condition, thereby engaging the terminal member b so that the terminal member b is secured. If the retainer g is further pushed into a fully secured position, as shown in FIG. 27, the insertion portion h of the retainer g is inserted into the flexibly deformable space f of the lance d. This assures that the terminal member b cannot be removed and the terminal member b is doubly secured.

In the conventional connector, the direction the retainer g is pushed toward the temporarily secured position is the same as the direction the retainer g is pushed from the temporarily secured position toward the fully secured position. In the temporarily secured position, although the retainer g is tentatively held, there is a possibility that the retainer g can be erroneously pushed into the fully secured position. If the retainer g is pushed into the fully secured position before the terminal member b is inserted, each lance d cannot be flexibly deformed. Thus, it is impossible to insert the terminal member b. This inevitably requires a complicated extra operation, where the retainer g must be returned back to the temporarily secured position, and the terminal member b must be reinserted, before the retainer g can be again pushed into its fully secured position.

In a conventional connector, when a male side front retainer-type connector is mounted into the male side of a connector housing, a hood can be provided. Since a tab of a male-type terminal member projects into the hood, it is impossible for a user to insert his or her hand into the housing. Therefore, a specially made tool or jig must be used to mount the retainer. This results in a poor and inexact operability. Also, the tab of the terminal member can be deformed as the retainer is mounted.

Further, the costs of conventional connectors can be high. In the above-mentioned conventional connectors, the connector is provisionally assembled so the retainer g is held in the temporarily secured position, and the connector is then transported to a terminal insertion location. Prior to the temporary assembling of the connector housing a and retainer g, the connector housing a and retainer g are separately molded by separate molding devices. After molding, the connector housing a and retainer g are carried to a assembly site, where they can be assembled by an automatic assembly machine, for example a parts feeder. Alternatively, they can be assembled manually by an operator.

The molding of the connector housing a and retainer g is separate from their assembly, and a temporarily assembled connector can be completed through the steps of molding, carrying and assembling the connector housing a and retainer g. Also, when the housing a and retainer g are manually connected together, an inspection step is required. Therefore, since a large number of steps are necessary for completion of the connector, the manufacturing costs increase. It is also necessary to separately manage and maintain the separate molds for the connector housing a and retainer g. This further adds to the cost of manufacturing of the connector.

SUMMARY OF THE INVENTION

The invention is directed to solving the problems found in conventional connectors. Accordingly, an object of the invention is to provide a connector, which can prevent a retainer from being erroneously inserted from a temporarily secured position to a fully secured position. Another object of the invention is to provide a method and molding device for manufacturing the connector. Further, it is another object of the invention to provide a method for mounting a retainer into a connector housing, where the retainer can be simply mounted into the connector housing without causing a terminal member to become deformed.

In accordance with one object of the invention, a connector comprises a connector housing, which includes cavities that are formed in an interior of the connector housing and into which a terminal member can be inserted, and a retainer that can be mounted into the connector housing so it can be moved between a temporarily secured position and a fully secured position. The movement is in a back-and-forth direction along the connector housing. The retainer is able to secure the terminal member to prevent its removal when the retainer is in the fully secured position. The connector housing includes a retainer insertion hole with an opening in the side surface, so the retainer can be inserted. When inserted into the retainer insertion hole, the retainer can be moved between the temporarily secured position and the fully secured position. The retainer is configured such that, after it is inserted into the retainer insertion hole and is held in the temporarily secured position, it can be further moved into the fully secured position.

A further object of the invention is achieved by providing a mounting method where the retainer is first inserted from the opening in the side surface of the connector housing into the retainer insertion hole. The retainer is held in the temporarily secured position and then, is further pushed into the retainer insertion hole in a back-and-forth direction of the connector housing to be moved into the fully secured position. The direction in which the retainer is pushed into the retainer insertion hole toward the temporarily secured position is different from the direction in which the retainer is further pushed into the retainer insertion hole from the temporarily secured position toward the fully secured position and is preferably orthagonal. Thus, it is possible to prevent the retainer, which must be held in the temporarily secured position, from being erroneously pushed into the fully secured positions. Therefore, the need for a retainer return operation, as discussed above, is eliminated. The retainer assembling operation can then be efficiently conducted.

According to another object of the invention, a method for manufacturing a connector is provided. The connector comprises a connector housing including cavities, which are formed in an interior of the connector housing to allow a terminal member to be inserted thereunto, and a retainer that can be mounted in the connector housing by pushing it into the connector housing to secure the terminal member preventing removal. The method comprises the steps of: closing together a pair of metal molds, which are disposed so they can be moved into contact with each other and separated from each other; simultaneously molding the connector housing and retainer, where the connector housing including a retainer insertion hole formed with an opening in a side surface so that the retainer can be inserted into the retainer insertion hole and moved in a back-and-forth direction of the connector housing, additionally where the retainer is positioned laterally of the retainer insertion hole; and inserting the retainer from the opening formed in the side surface of the connector housing into the retainer insertion hole, after opening the two molds to assemble the retainer with the connector housing.

According to another object of the invention, a molding device for manufacturing a connector is provided. The connector comprises a connector housing including cavities, which are formed in an interior of the connector housing and into which a terminal member can be inserted, and a retainer that can be pushed into and mounted in the connecting house in a back-and-forth direction, and when mounted in the connecting house can secure the terminal member in a removal preventive manner. The molding device comprises a pair of metal molds which can be moved into contact with and separated from each other. Molding spaces are provided between the two molds, which mold the connector housing including a retainer insertion hole with an opening in a side surface into which the retainer can be inserted to be movable in the connector housing. An inserting means is provided for molding the retainer, which is situated laterally of the retainer insertion hole. After the two molds are separated from each other, the inserting means allows the retainer to be inserted into the connector housing from the opening formed in the side surface of the retainer insertion hole.

With the pair of molds closed, the connector housing is molded including the retainer insertion hole with an opening opened up in the side surface. The retainer is molded with the connector housing at a position lateral of the retainer insertion hole. After the two molds are opened, the retainer is inserted from the opening formed in the side surface of the connector housing into the retainer insertion hole by inserting means. The retainer and connector housing are then assembled together into an integral, single body.

Since the molding and assembling of the connector housing and retainer can be carried out within in a single molding device, which consists of the two molds, the number of manufacturing steps of the connector is shortened. Thus, an inexpensive connector formed integral with the retainer can be achieved.

According to yet another object of the invention, a connector comprises a connector housing including cavities, which are formed in an interior of the connector housing and into which a terminal member can be inserted, and a retainer that can be mounted into the connector housing so it can be moved along an insertion direction of the terminal member between a temporarily secured position and a fully secured position. The retainer is able to secure the terminal member to when the retainer is in the fully secured position. A retainer insertion hole is formed with an opening in the side surface of the connector housing. The retainer can be inserted into the retainer insertion hole so it can be moved between the temporarily and fully secured positions. The retainer is configured such that, with part of the retainer remaining in the opening, the retainer can be inserted into the temporarily secured position. The retainer can then be pushed into the fully secured position from the side surface side of the connector housing.

According to a further object of the invention, a method for mounting a retainer into a connector housing is provided. The connector comprises a connector housing including cavities, which are formed in an interior of the connector housing and into which a terminal member can be inserted, and a retainer that can be mounted into the connector housing so it can be moved between a temporarily secured position and a fully secured position. The movement is in an insertion direction of the terminal member. The retainer is able to secure the terminal member to prevent removal when the retainer is in the fully secured position. The method for mounting the retainer into the connector housing comprises the steps of: inserting the retainer into the temporarily secured position from the side surface of the connector housing at an intersecting direction at right angles to the insertion direction of the terminal member; and, pushing the retainer into the fully secured position along the insertion direction of the terminal member by moving the retainer from the side surface side of the connector housing.

The retainer is inserted into the connector housing from the opening formed in the side surface of the connector housing along the direction intersecting at right angles to the insertion direction of the terminal member. The retainer is mounted at the temporarily secured position, with the retainer staying in the opening. The retainer is further pushed into the connector housing from the side surface side of the connector housing in an insertion direction of the terminal member. The retainer is held at the fully secured position. Thus, the terminal member can be secured so that it is prevented from being removed. Since the retainer push operation is carried out from the side surface side of the connector housing, without any interference, the operation can be efficiently performed. It is possible to prevent the retainer from butting against the terminal member thus preventing the terminal member from being deformed.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

The invention will be described in detail with reference to the following drawings in which like reference numerals refer to like elements and wherein.

DESCRIPTION OF PREFERRED EMBODIMENTS

Now, a description will be given below in detail of the preferred embodiments of the invention with reference to the accompanying drawings. FIG. 1 through FIG. 13 illustrate a first preferred embodiment of a connector according to the invention. The first preferred embodiment illustrates a female side connector on a front retainer-type connector. The connector includes a female side connector housing or female housing 1 and a retainer 3, which can be pushed and mounted into the female housing 1. The retainer 3 can doubly secure a female terminal member 2 in the housing, as described below.

Figure 1:
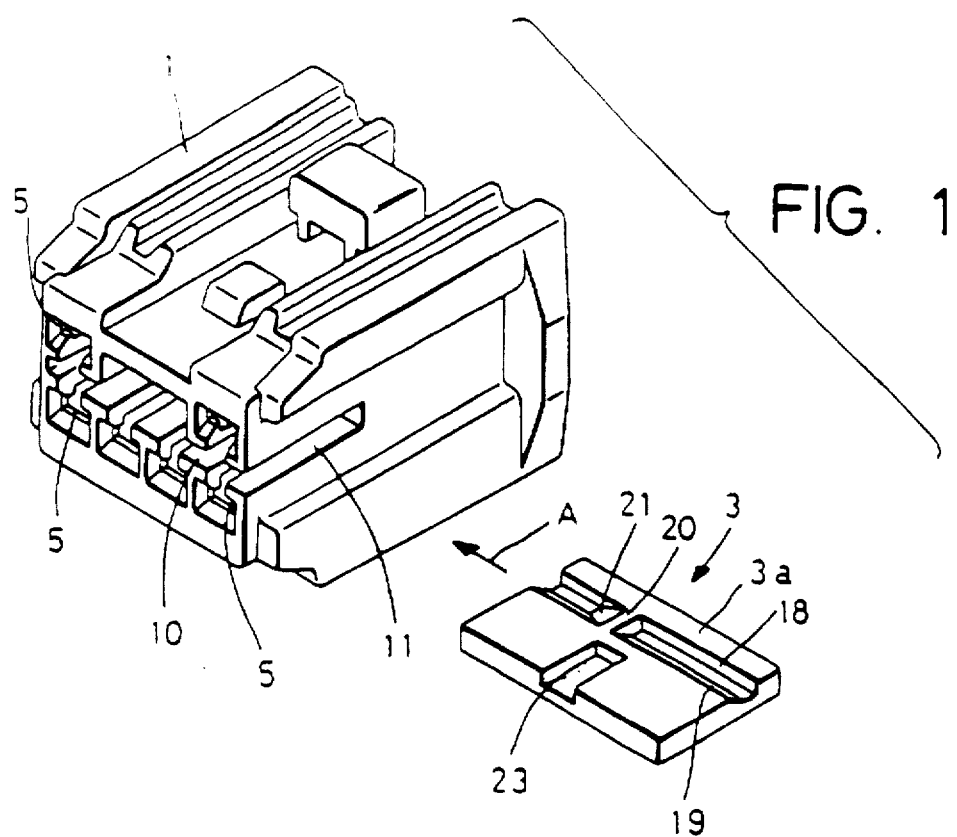
FIG. 1 is a perspective view of a first preferred embodiment of a connector according to the invention, illustrating a retainer before it is mounted into a female housing.
Figure 4:
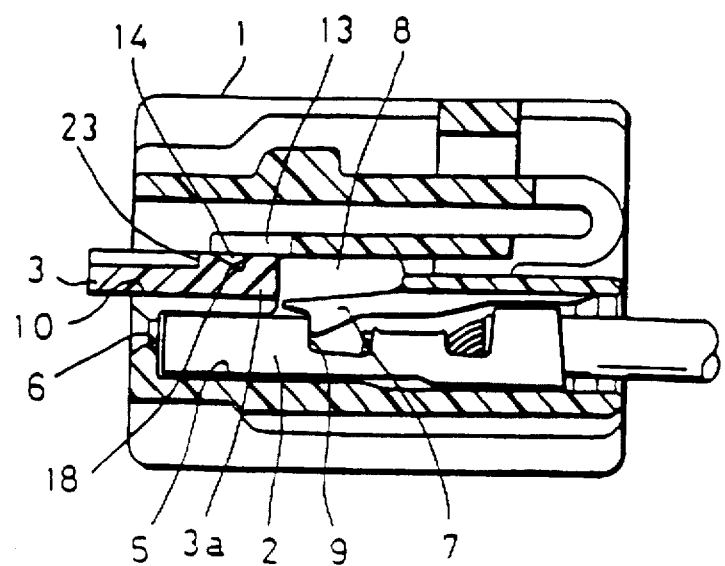
FIG. 4 is a longitudinal section view of the connector of FIG. 1, where the retainer is mounted at the temporarily secured position.

The female housing 1, as shown in FIGS. 1 and 4, is an integral member formed of synthetic resin in a suitable shape, for example a substantially rectangular parallelepiped shape. The interior of the female housing 1 has a plurality of cavities 5 formed therein. A female terminal member 2 can be inserted into the female housing 1 from the rear surface side of the female housing 1 (the right side in FIG. 4). On the front surface side of the female housing 1, a terminal insertion hole 6 is formed. A tab 60 (FIG. 15) of a male terminal member 52 can be provided in the hole 6, as described hereinafter. The cavities 5 are formed in two stages: four cavities are arranged in a side-by-side lateral relationship in a lower stage; and, in an upper stage, two cavities are formed at the right and left end portions of the female housing 1. Thus, a total of six cavities are formed. However, any suitable number of cavities 5 may be formed, and the above is merely exemplary of the number of cavities, and is in no way meant to be limiting.

The upper and lower cavities 5 are symmetrically arranged with respect to a vertical direction. On the ceiling surfaces of each of the lower cavities 5 and on the bottom surfaces of each of the upper cavities 5, a flexibly deformable lance 7 is provided. Each lance 7 has a cantilever shape and functions to secure the female terminal member 2 in a first position. The operation of a lance 7 in each lower cavity is substantially similar therefore, reference to one cavity will be described.

Referring to a lower cavity 5, if the female terminal member 2 is inserted from the rear surface side of the cavity 5, the female terminal member 2 is pushed while the lance 7 is flexibly deformed within its flexibly deformable space 8. When the female terminal member 2 is inserted into a fully inserted position, the lance 7 returns to its original position due to its own recovering elasticity. In the fully inserted position, the lance 7 fits into a jaw portion or opening 9 of the female terminal member 2, thereby securing the female terminal member 2 to prevent removal. Each upper lance 7 functions similarly to the lower lances, except that their flexibly deforming direction is opposite.

In the front surface of the female housing 1, between the upper and lower cavities 5, a retainer insertion hole 10 is formed. The retainer insertion hole 10 extends toward an opposite side of the female housing 1 so the retainer 3 can be inserted into the retainer insertion hole 10. The furthest or deepest portion of the retainer insertion hole 10 communicates with the flexibly deformable space 8 for each lance 7. Also, as shown in FIG. 1, the retainer insertion hole 10 opens on a side surface of the female housing 1. An opening 11 of the retainer insertion hole 10 has a length substantially equal to a width of the retainer 3.

The retainer 3 is formed of synthetic resin, similar to the female housing 1. As shown in FIG. 1, the retainer 3 is formed as a flat plate that can be inserted into the retainer insertion hole 10. A front edge side of the retainer 3 is formed with a projection portion 3a, which projects into the flexibly deformable spaces 8 of the lances 7. The retainer 3 is inserted into the retainer insertion hole 10 from the opening 11 in the side surface of the female housing 1 in the direction of arrow A, FIG. 1.

As shown in FIG. 4, the retainer 3 is inserted and held in a position where the rear end edge (the left edge in FIG. 4) projects from the opening 11 formed in the retainer insertion hole 10 on the front surface side of the female housing 1. This position is the temporarily secured position of the retainer 3, where the projection portion 3a remains in front of the flexibly deformable spaces 8 of the lances 7.

Figure 7:
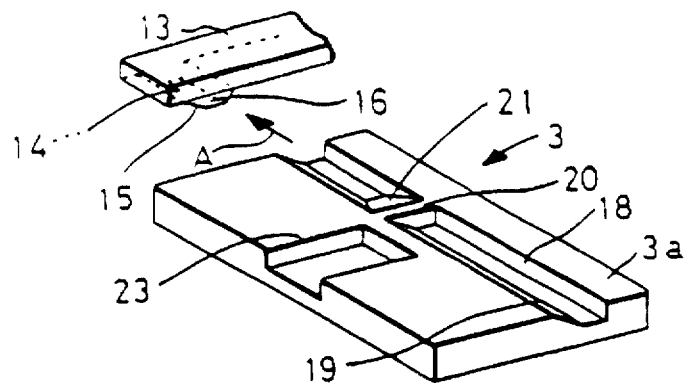
FIG. 7 is a perspective view of a retainer and a lock piece.

In order to hold the retainer 3 in the temporarily secured position, a flexibly deformable lock piece 13 projects forwardly in a cantilevered manner (to the left side in FIG. 4). The lock piece 13 is formed on the portion of the ceiling surface substantially central of the retainer insertion hole 10. A lock projection 14 is provided on the lower surface leading end portion of the lock piece 13. As shown in FIG. 7, the front surface side in the projecting direction of the lock projection 14 is formed as a tapered surface 15. The side surface side of the lock projection 14 is located on this side as seen in FIG. 7, and is also formed as a tapered surface 16.

A guide groove 18 is formed in the upper surface of the retainer 3 on the side of the projection portion 3a. The guide groove 18 extends in an insertion direction, shown by arrow A in FIGS. 1 and 7, so the lock projection 14 of the lock piece 13 fits into the guide groove 18. The side wall of the guide groove 18 is formed as a tapered surface 19 and corresponds to the tapered surface 15 of the lock projection 14. A securing portion 20 is formed in the middle of the guide groove 18 in the longitudinal direction. The front surface side of the securing portion 20 in direction A is also formed as a tapered surface 21.

Figure 8:
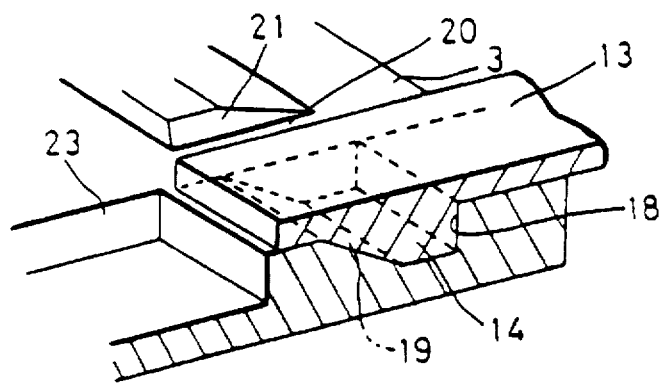
FIG. 8 is a partially cutaway perspective view of the retainer and lock piece, illustrating where the retainer is locked at the temporarily secured position.
Figure 9:
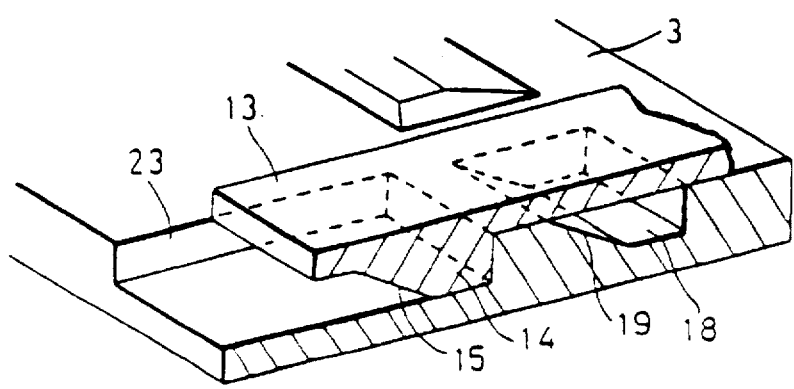
FIG. 9 is a partially cutaway perspective view of the retainer and lock piece, where the retainer is locked at the fully secured position.

Referring now in detail to the insertion of the retainer 3, while the lock projection 14 is fit into the guide groove 18, the retainer 3 is inserted in the direction, of arrow A, as shown in FIGS. 1 and 7. The lock projection 14 then intersects with the tapered surface 21 of the securing portion 20, while the lock piece is flexibly deformed. The retainer 3 butts against the side wall of the female housing 1 on the opposite side, as shown in FIG. 8. The lock piece 13 is deformed and returns to its original condition, with the lock projection 14 fit within the rear surface side of the securing portion 20. Thus, the retainer 3 is held in the temporarily secured position.

Figure 2:
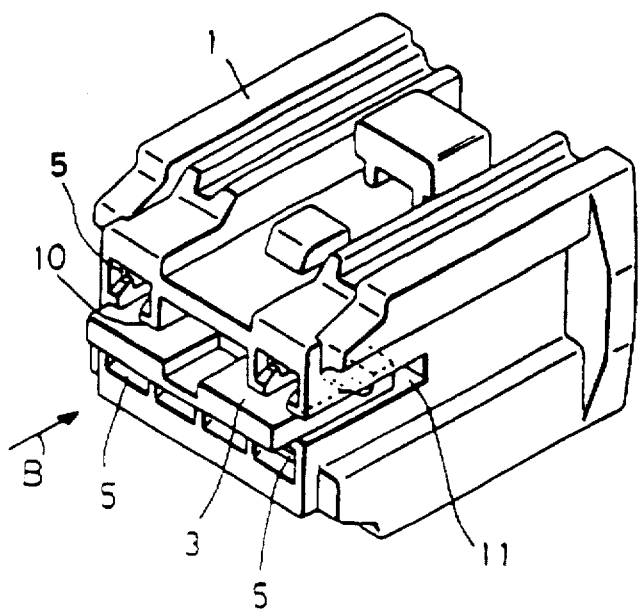
FIG. 2 is a perspective view of the connector in FIG. 1, where the retainer is mounted at a temporarily secured position.
Figure 5:
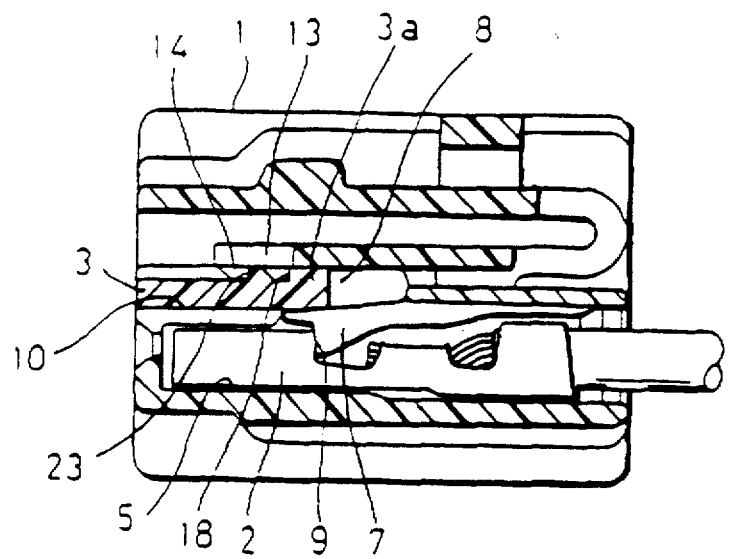
FIG. 5 is a longitudinal section view of the connector of FIG. 1, where the retainer is mounted at the fully secured position.

If the retainer 3, which is held in the temporarily secured position, is pushed from the front side of the female housing 1 in a direction of arrow B, shown in FIG. 2, the retainer 3 is further inserted into the female housing 1. Thus, the retainer 3 is held in the fully secured position. At the fully secured position, as shown in FIG. 5, the projection portion 3a of the retainer 3 is projected into a respective flexibly deformable space 8 of a lance 7, to restrict deformation of the lance 7.

As shown in FIG. 7, a securing groove 23 is formed in the upper surface of the retainer 3 to hold the retainer 3 at the fully secured position. The securing groove 23 extends at right angles to the guide groove 18, so the lock projection 14 of the lock piece 13 fits into the securing groove 23. The securing groove 23 begins at a position just on the rear side of the securing portion 20 in the insertion direction A. The securing groove 23 is spaced a given distance to the left of the guide groove 18, as in FIG. 7. Therefore, the retainer 3 can be further pushed from the temporarily secured position, into the retainer insertion hole 11 in the direction of arrow B, FIG. 2. The lock projection 14 slides along the tapered surface 19 of the guide groove 18 and the upper surface of the retainer 3, while the lock projection 13 is flexing and deforming. When the retainer 3 is pushed into the fully secured position, the lock projection 14 fits into the securing groove 23, while the lock piece 13 has deformed and returns to its original position.

Next, a description will be given below of the operation of the connector. The retainer 3 is first inserted from the opening 11 in the side surface of the female housing 1, in the direction of arrow A of FIG. 1, into the retainer insertion hole 10. The retainer 3 is then held in the temporarily secured position, as shown in FIGS. 2 and 4. In the temporarily secured position, the projection portion 3a of the retainer 3 remains in front of each flexibly deformable spaces 8 for the lances 7. Therefore, the lances 7 are in a flexibly deformable position.

In this position, if the female terminal member 2 is inserted into the cavities 5, the female terminal member 2 can be pushed into the female housing 1, while flexibly deforming each lance 7 toward the interior of the respective flexibly deformable space 8. When the female terminal member 2 is inserted to its fully inserted position, the lance 7 is elastically deformed and returns to its original position. The lance 7 then fits with the jaw portion 9 of the female terminal member 2. As shown in FIG. 4, the female terminal member 2 is secured so it is prevented from being removed.

Figure 3:
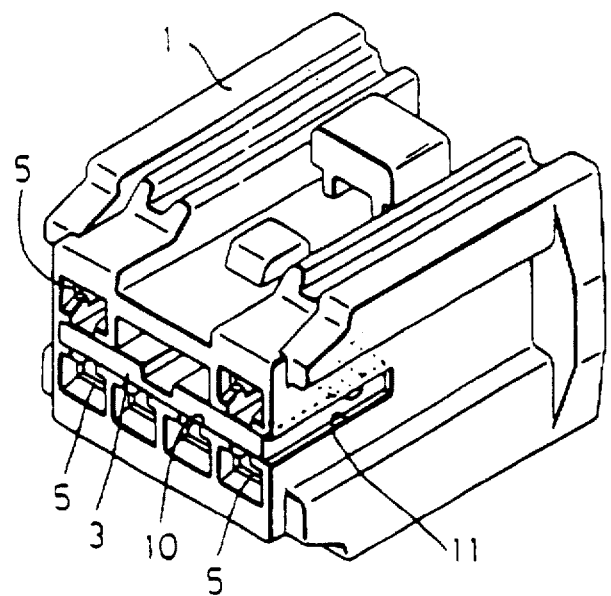
FIG. 3 is a perspective view of the connector in FIG. 1, where the retainer is mounted at a fully secured position.

From the position shown in FIG. 2, the rear edge portion of the retainer 3, which projects from the front surface of the female housing 1, is pushed the direction of arrow B in FIG. 2. The retainer 3 can then be held in the fully secured position, which is further into the housing 1 than the temporarily secured position, as shown in FIGS. 3 and 5. In the fully secured position, the projection portion 3a of the retainer 3 projects into each flexibly deformable space 8 of a lance 7. Flexible deformation of the lance 7 is restricted to prevent the female terminal member 2 being removed. Thus, the retainer 3 is doubly secured.

Figure 6:
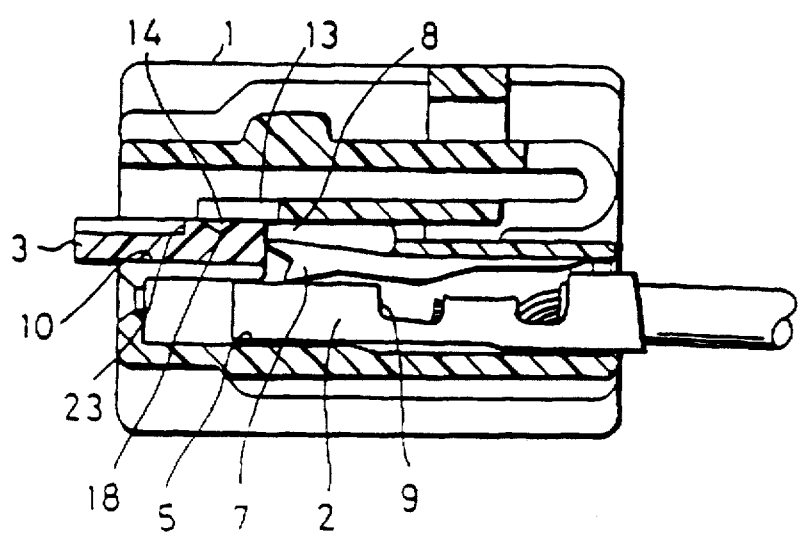
FIG. 6 is a longitudinal section view of the connector in FIG. 1, where half-insertion of a terminal member is detected.

When the female terminal member 2 is inserted into each cavity 5 and it is in a half-insertion position, as shown in FIG. 6, each lance 7 is flexed and projects into each space 8. The retainer 3 then butts against the lance 7 and cannot be pushed into the fully secured position. This indicates that the female terminal member 2 is in a half-insertion position.

As described above, the direction to push the retainer 3 toward the temporarily secured position extends at right angles to the direction to push the retainer 3 from the temporarily secured position more deeply toward the fully secured position. The two retainer directions are distinct and preferably orthagonal to assure that there is no possibility that the retainer 3, which must be held in the temporarily secured position, can be erroneously pushed directly into the fully secured position. This eliminates a need for an operation to return the retainer 3, so the retainer 3 can be assembled with the female housing 1 with a high efficiency.

Also, with the connector as described above, molding of the female housing 1 and retainer 3, and the provisional assembly of the female housing and retainer 3 can be conducted using a single metal molding device consisting of a pair of metal molds. Next, a description will be given in detail of a molding device for manufacturing the female housing 1 and retainer 3, and a method for manufacturing and assembling the female housing 1 and retainer 3 using the same molding device.

The molding device for manufacturing the female housing 1 and retainer 3 is incorporated into an injection molding system. The main portions of the molding device are as described below. In FIGS. 10 through 13, the molding device and the connector are shown in a simplified manner to facilitate explanation. The front portion side of the female housing 1 refers to the left side in FIG. 10, while the front portion side of the retainer 3 refers to the right side in FIG. 10.

Figure 10:
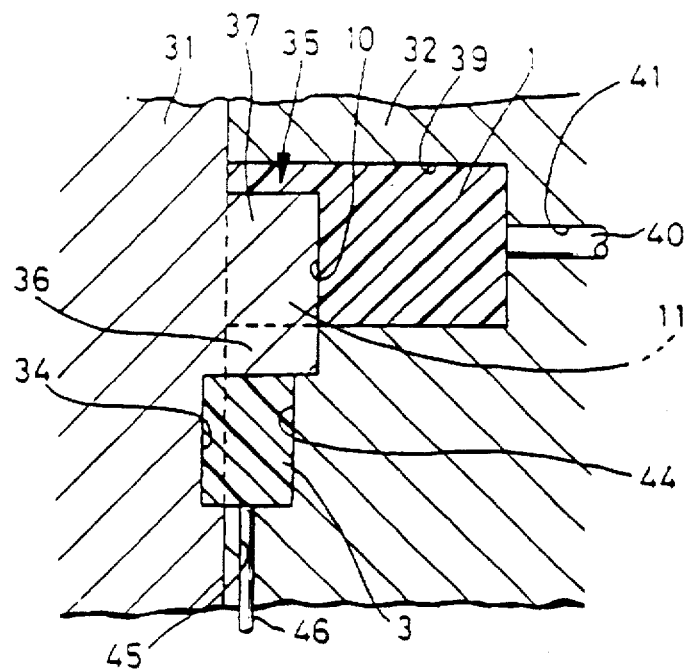
FIG. 10 is a section view of a molding device made of metal, illustrating a retainer and connector housing molded by the molding device.

The molding device, according to one preferred embodiment of the invention comprises a pair of metallic molds, a fixed metal mold 31 and a movable metal mold 32. A retainer molding recessed portion 34 is formed on the molding surface of the fixed mold 31. The retainer molding recessed portion 34 is used to mold the rear end portion of the retainer 3 that projects from the front surface of the female housing 1 when the retainer 3 is in a temporarily secured position. In FIG. 10, a core portion 35 projects above the retainer molding recessed portion 34 and includes an inverted "T-shaped" front surface. The core portion 35 also includes a horizontal portion 36, which is used to mold the upper surface of the remaining front portion side of the retainer 3 and the lower surface of a part of the front portion side of the female housing 1. A vertical portion 37 of the core portion 35 extends from a position slightly lower than the upper end of the interior of the housing molding recessed portion 39. The vertical portion 37 molds the retainer insertion hole 10, which is opened to extend from the front surface of the female housing 1 over the lower surface.

The movable mold 32 is connected to a drive mechanism (not shown) that advances and retreats the movable mold 32 at given strokes in the right and left directions (as seen in the figures). The movable mold 32 can thus be moved into contact with and separate from the fixed mold 31. In the molding surface of the movable mold 32, a housing molding recessed portion 39 is formed, that molds the female housing 1 in cooperation with the horizontal portion of the core portion 35 of the fixed mold 31. In a deeper surface of the housing molding recessed portion 39, an insertion hole 41 is formed. A projecting pin 40 is inserted in into the insertion hole 41 so it is free to advance and retreat.

On a lower surface side of the housing molding recessed portion 39, a retainer molding recessed portion 44 is formed corresponding to the retainer molding recessed portion 34 of the fixed mold 31. The retainer molding recessed portion 44 is used to mold the front portion side of the retainer 3. In the lower surface of the retainer molding recessed portion 44, an insertion hole 45 extends in the vertical direction of the retainer molding recessed portion 44. An inserting pin 46 is in the insertion hole 45. The inserting pin 46 can be driven by an appropriate drive, such as a cylinder drive mechanism (not shown), so it can advance and retreat.

A description of a procedure for molding the female housing 1 and retainer 3, and assembling them together using the molding device, will now be provided.

As shown in FIG. 10, the projecting pin 40 and inserting pin 46 are in their retreated position. The movable mold 32 is advanced to close the two molds 31 and 32. The vertical portion 37 of the core portion 35 of the fixed mold 31 is fit into the housing molding recessed portion 39 of the movable mold 32. Then, the cavity for the female housing 1 and retainer 3 is filled with molten resin. The female housing 1, including the retainer insertion hole 10 that extends from the front surface of the female housing 1 over the lower surface due to existence of the vertical portion 37 of the core portion 35 and the retainer 3 that is situated below the female housing 1, can then be molded.

Figure 11:
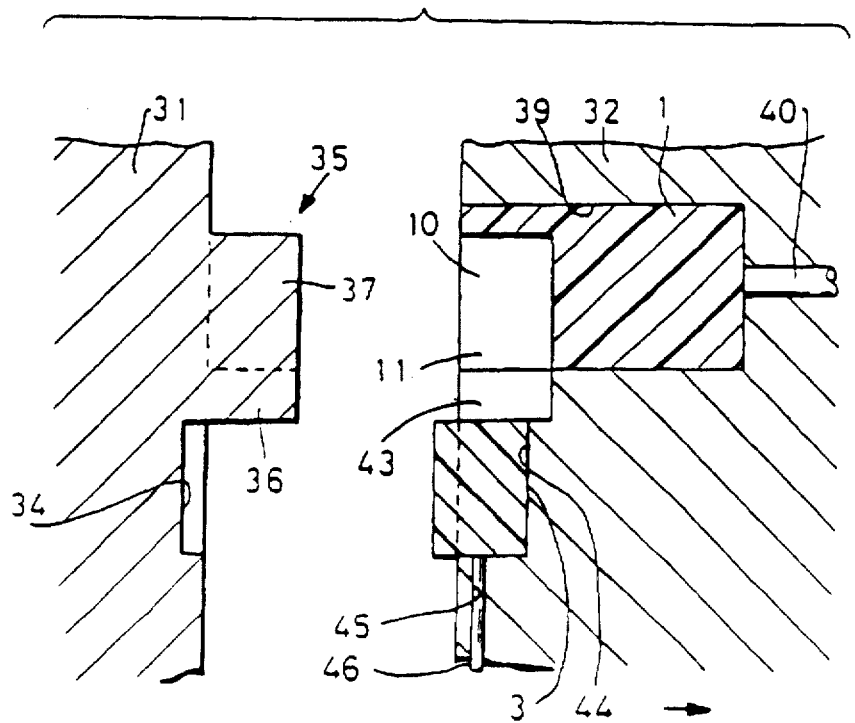
FIG. 11 is a section view of the molding device, where a movable mold is being opened from a fixed mold.

After a given time, the molten resin hardens and the movable mold 32 is retracted. The two molds 31 and 32 are then separated from each other, as shown in FIG. 11. At this time, the female housing 1 and retainer 3 are held by the movable mold 32.

Figure 12:
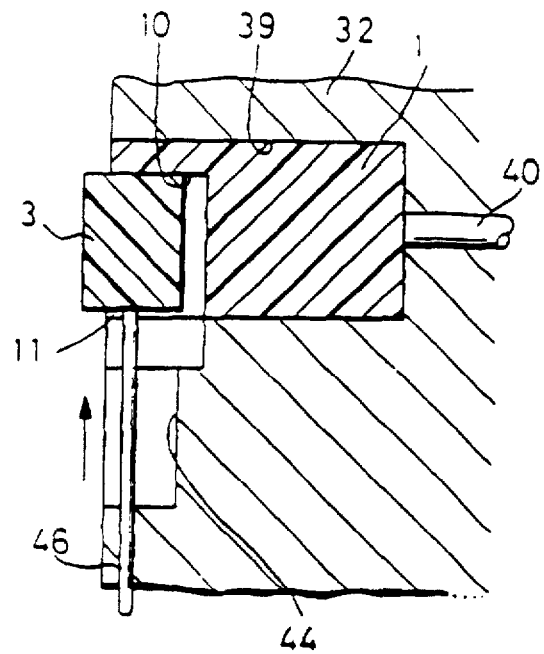
FIG. 12 is a section view of the molding device, where the retainer is assembled to the connector housing.
Figure 13:
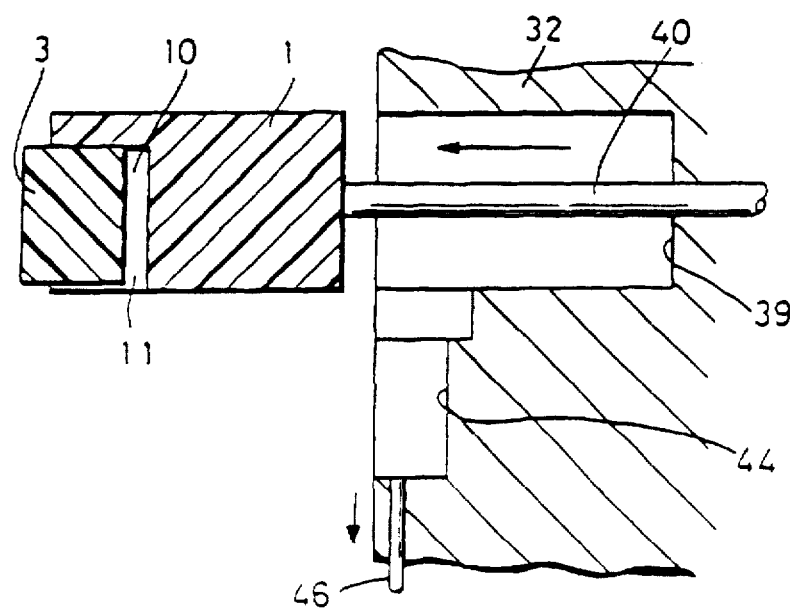
FIG. 13 is a section view of the molding device, where an finished or assembled connector is taken out.

When the molds 31 and 32 are opened, as shown in FIG. 12, the inserting pin 46 on the lower surface side of the retainer molding recessed portion 44, is advanced. The retainer 3 is then driven or lifted, while being guided by the deep side surface of the retainer molding recessed portion 44. The retainer 3 is thereby inserted into the opening 11 on the lower side of the retainer insertion hole 10 (in FIG. 12), where the retainer 3 can be provisionally assembled at the temporarily secured position. On completion of the provisional assembly of the retainer 3, the inserting pin 46 is retracted to its original position, FIG. 13. The projecting pin 40 is simultaneously extended, so the retainer 3 is provisionally assembled to the female housing 1 and can be projected out of the movable mold 32, and removed from the movable mold 32.

As described above, the molding the female housing 1 and retainer 3 and their provisional assembly can be carried out at the same time. This eliminates a need for delivery of the female housing 1 and retainer 3 to another site for assembly. Thus, the number of the steps required for manufacturing the connector is reduced, which in turn shortens the time necessary for completion of the product. The manufacturing cost of the connector is reduced. Also, since two different molded products, i.e., the female housing 1 and retainer 3, can be molded within a single molding device, the invention is also advantageous for control purposes.

Figure 14:
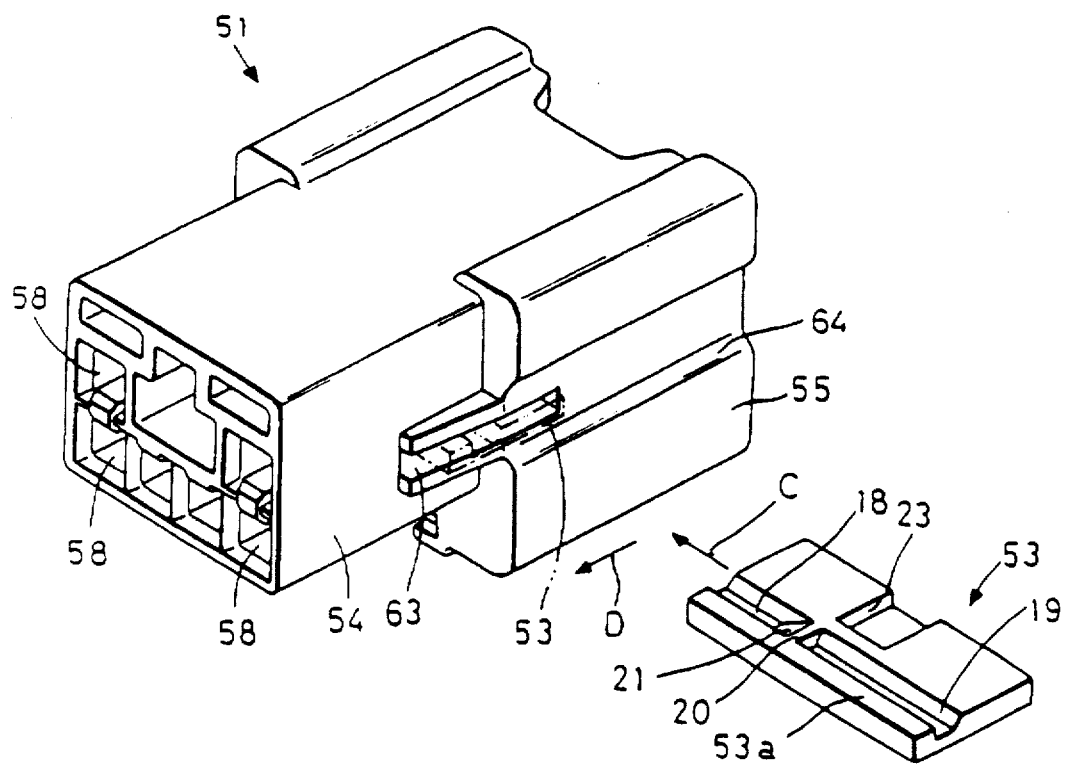
FIG. 14 is a perspective view of a second preferred embodiment of a connector, illustrating a retainer before it is mounted.
Figure 15:
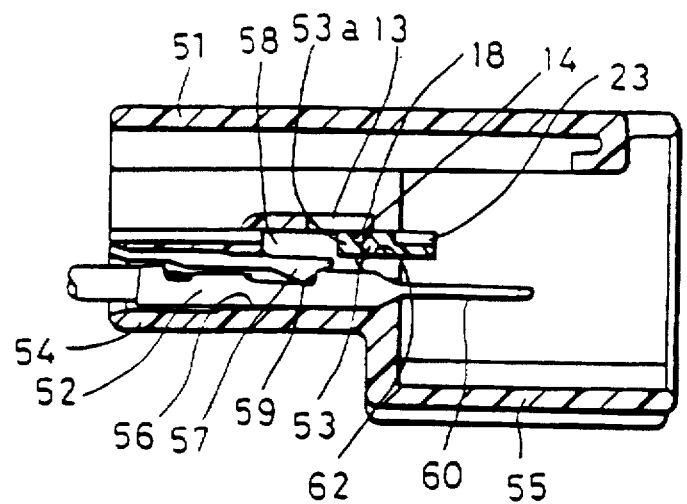
FIG. 15 is a longitudinal section view of the second preferred embodiment, illustrating when the retainer is mounted at a temporarily secured position.
Figure 16:
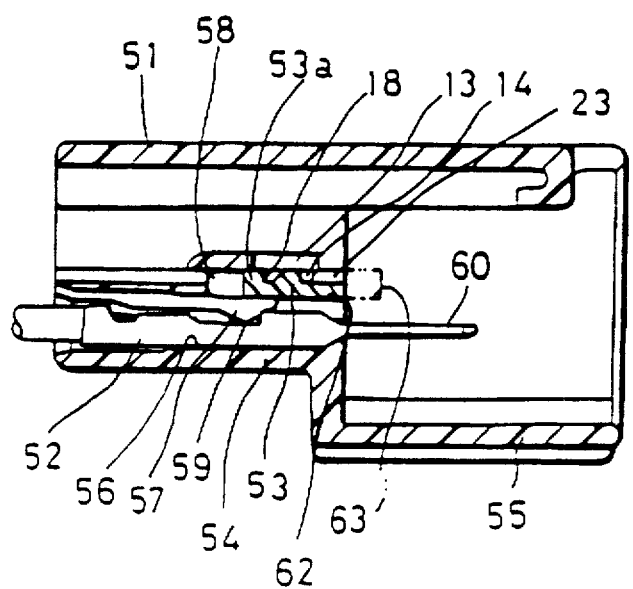
FIG. 16 is a longitudinal section view of the second preferred embodiment, illustrating when the retainer is mounted at a fully secured position.

FIGS. 14 through 16 illustrates a second preferred embodiment of a connector. In the second preferred embodiment, a male side connector of a front retainer-type, which can be fit with the female side connector of the first embodiment, includes a male side connector housing or male housing 51 and a retainer 53 used to secure a male terminal member 52.

The male housing 51 is similar to the female housing 1. It is an integral member formed of synthetic resin and includes a main body 54. On the front side (right side in FIG. 15) of the main body 54, a hood portion 55 is provided onto which a female housing, such as, for example, the female housing employed in the first preferred embodiment, can be fit. In the interior portion of the main body 54, a plurality of cavities 56 are formed, such as but not limited to six cavities corresponding to cavities in the female housing 1.

When a male terminal member 52 is inserted into the cavities 56 from the rear surface side of the male housing 51 (left side in FIG. 15), lances 57, which are provided in each cavity 56, are elastically deformed. Each lance 57 fits into the jaw portion 59 of the male terminal member 52. Thereby, the male terminal member 52 has its tab 50 projecting into the hood portion 55, so the male terminal member 52 is primarily secured in a removal prevention position.

On the front surface of the main body 54 of the male housing 51, a retainer insertion hole 62 is formed. The retainer insertion hole 62 extends to the flexibly deformable spaces 58 for each of the lances 57. The retainer insertion hole 62, as shown in FIG. 14, extends from one side surface of the main body 54 on the front end side to a portion of a groove 64 formed in the hood portion 55. The retainer insertion hole 62 continues on the same side surface of the main body, while an opening 63 of the retainer insertion hole 62 is formed so that it has a length, in a back-and-forth direction, greater than the width of the retainer 53.

The retainer 53, similar to the other preferred embodiments, is formed as a flat plate that can be inserted into the retainer insertion hole 62. An end edge of the retainer 53 is formed as a projection portion 53a, which can project into the flexibly deformable spaces 58 for each of the lances 57. If the retainer 53 is inserted in the opening 63 in the direction of arrow C in FIG. 14, the retainer 53 can be held in a temporarily secured position. In the temporarily secured position, the projection portion 53a of the retainer 53 remains in front of the flexibly deformable spaces 58 of the lances 57. Also, the rear edge side of the retainer 53 in the insertion direction C projects from the opening 63, as shown by the broken line in FIG. 14.

The retainer 53 is then further inserted into the retainer insertion hole 62, in the direction of arrow D, and is held in the fully secured position. In the fully secured position, the projection portion 53a of the retainer 53 projects into the flexibly deformable spaces 58 for each of the lances 57. This mechanism holds the retainer 53 at the temporarily and fully secured position, similarly as the first preferred embodiment. Therefore, the similar parts are given the similar reference characters, and a duplicative description is omitted.

A description of the operation of the second preferred embodiment will now be provided. At first, the retainer 53 is inserted from the right side (FIG. 14) of the opening 63 formed in the side surface of the male housing 51 into the retainer insertion hole 62. The retainer 53 is inserted along in the direction of arrow C (FIG. 14), and temporarily held in the securing position, shown in FIG. 15. In this position, the projection portion 53a of the retainer 53 remains on the side of the flexibly deformable spaces 58 of the lances 57, thus the lances 57 are in a flexibly deformed position. In this position, if the male terminal member 52 is inserted into the cavities 56, the male terminal member 52 can be pushed and the lances 57 flexibly deformed. When the male terminal member 52 is inserted to its fully inserted position, the lances 57 are then elastically deformed and restored back to their original positions. Each lance 57 then fits into a corresponding jaw portion 59 of the male terminal member 52. The male terminal member 52 is secured in a removal prevention position.

When a finger or other object contacts a retainer 53 projecting from an opening 63 formed in the side surface of a groove 64 on the hood portion 55, the retainer 53 can be pushed in the direction of arrow D, FIG. 14. As shown in FIG. 16, the retainer 53 is held in the fully secured position, where the projection 53a of the retainer 53 projects into the flexibly deformable spaces 58 of the lances 57. Flexible deformation of the lances 57 is restricted to prevent the male terminal member 52 from being removed. Thus, the male terminal member 52 is further secured. Although not illustrated, if the male terminal member 52 is held in a half-insertion position, the half-insertion position can be detected, similar to the first preferred embodiment.

As described above, according to this preferred embodiment, the direction that the retainer 53 is pushed to the temporarily secured position is different from the direction the retainer 53 is pushed from the temporarily secured position to the fully secured position. Therefore, the retainer 53 held in the temporarily secured position cannot be erroneously pushed into the fully secured position. Thus, similarly to the first preferred embodiment, the need for an operation to return the retainer 53 is eliminated, so that the retainer assembly operation can be efficiently conducted.

In conventional connectors, the retainer is simply inserted from the front surface of the male housing. However, as described herein, a hood portion 55 interferes when the retainer is mounted at a temporarily secured position. When the retainer 53 is pushed further into the fully secured position from the temporarily secured position, the tab, 60 of the male terminal member 52 which projects into the hood portion 55, interferes with the retainer. In either case, it takes a substantial amount of time and effort to insert the retainer. On the other hand, the retainer 53 can be inserted from the side surface side of the male housing 51, where no obstacles are found. Thus, the insertion operation of the retainer 53 can be conducted with high efficiency.

Also, in the first or second preferred embodiments, the molding of the housing and retainer and the provisionally assembly of the housing and retainer together can be executed in a single metal molding device.

A description will be given of a connector according to a third preferred embodiment of the invention, with reference to FIGS. 17–24. The third preferred embodiment, similarly to the second preferred embodiment, illustrates a male side connector of a front retainer-type.

Figure 19:
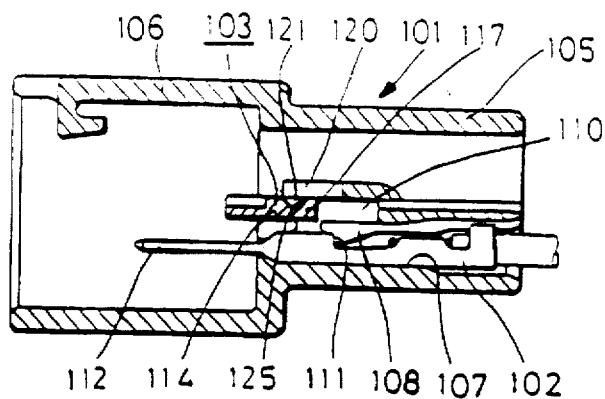
FIG. 19 is a longitudinal section view of the third preferred embodiment, illustrating the retainer inserted to the temporarily secured position.
Figure 20:
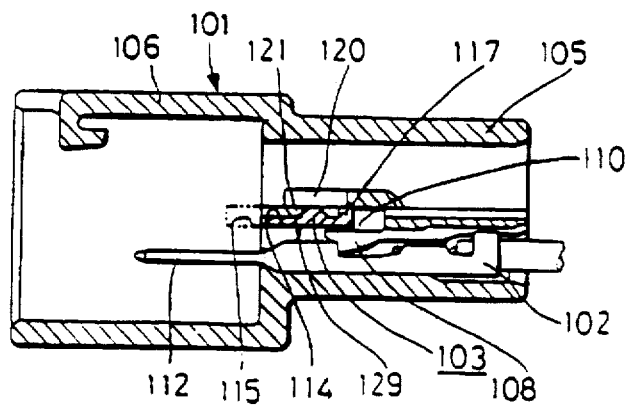
FIG. 20 is a longitudinal section view of the third preferred embodiment, illustrating the retainer in a fully secured position.
Figure 21:
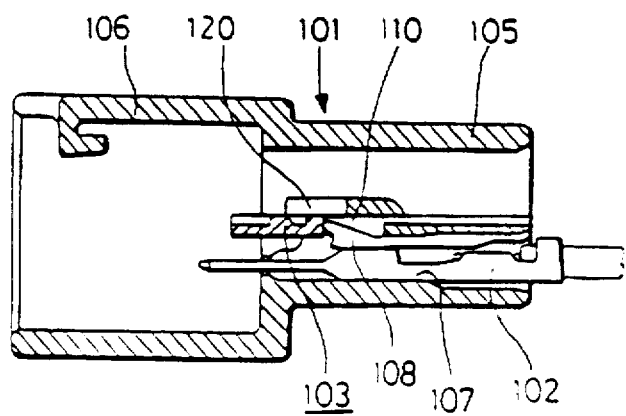
FIG. 21 is a longitudinal section view of the third preferred embodiment, illustrating where half-insertion of a terminal member is detected.

In the third preferred embodiment, the connector includes a male housing 101 and a retainer 103, used to secure a male terminal member 102. The male housing 101 is an integral member formed of synthetic resin and includes a main body 105. On a front surface side of the main body 105 the left side in FIG. 19, a hood 106 is provided. A mating female housing (not shown) can be fit into the interior portion of the hood 106. In the interior of the main body 105, a plurality of cavities 107 are formed. In particular, in the two ends of the main body 105, the cavities are arranged as upper and lower cavities. In the central portion of the main body 105, the cavities are arranged as a single lower cavity. The upper and lower cavities 107 are formed symmetrical to each other with respect to the vertical direction. In the ceiling surfaces of the lower cavities 107 of the lower cavities and in the bottom surface of the upper cavities, lances 108 are provided. The lances 108 are formed in a cantilever shape and can be flexibly deformed. FIGS. 19–21 respectively illustrate longitudinal section views of the portion of the male housing 101, in which only lower cavities 107 are formed.

The lances 108 each secure a male terminal member 102. For each lower cavity 107, if the male terminal member 102 is inserted into the cavities 107, the lance 108 is flexibly deformed into the flexibly deformable spaces 110 formed above the lances 108. The male terminal member 102 can then be pushed into the cavities 107. If the male terminal member 102 is inserted to a fully inserted position, the lances 108 then return back to their original positions. The lances 108 cooperate with a jaw portion 111 of the male terminal member 102, thereby causing a tab 112 of the male terminal member 102 to project into the hood 106. The male terminal member 102 can be secured preventing removal. The lances 108 in the upper cavities also operate similarly to the lower cavity lances, except that their direction of flexible deformation is opposite.

Figure 17:
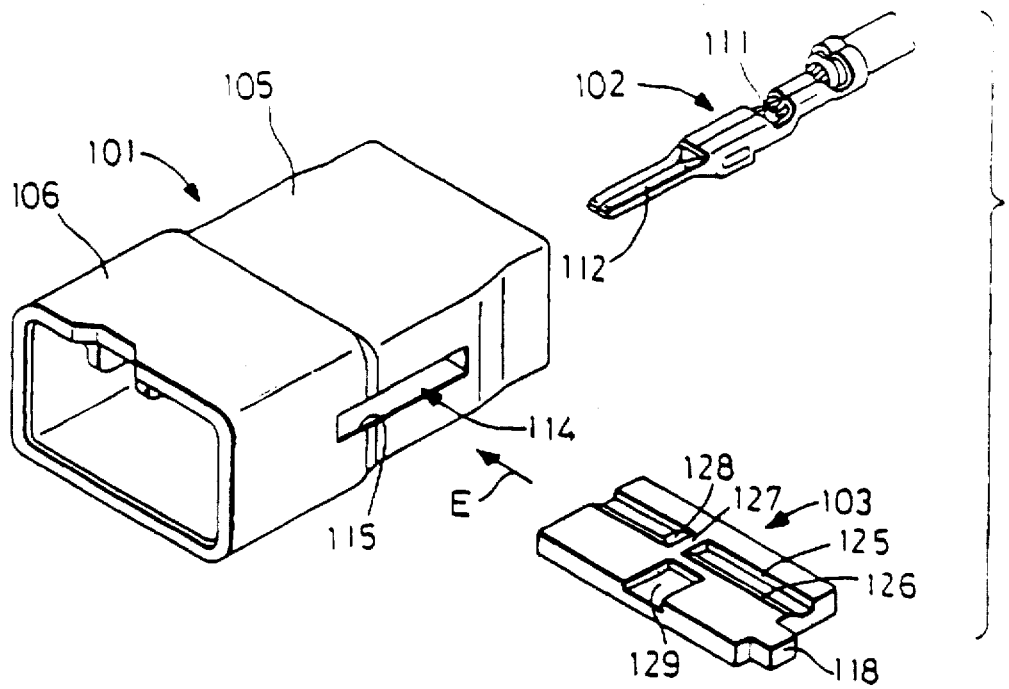
FIG. 17 is a perspective view of a third preferred embodiment of a connector according to the invention, illustrating a retainer before it is mounted.

In the front surface of the main body 105 of the male housing 101, a retainer insertion hole 114 extends to the flexibly deformable spaces 110 for the lances 108. The retainer insertion hole 114, as shown in FIG. 17, extends from one side surface of the main body 105 to a portion of the hood 106, continuing with the side surface. The opening 115 of the retainer insertion hole 114 has a length larger than the width of the retainer 103 in a back-and-forth direction i.e., a direction extending along the insertion direction of the male terminal member 102.

The retainer 103 is formed of synthetic resin. As shown in FIG. 17, the retainer 103 is formed in a flat plate-like shape and can be inserted into the retainer insertion hole 114. The front edge side (right side in FIG. 19) of the retainer 103 is formed as a projection portion 117, which can project into each of the flexibly deformable space 110 of each lance 108. The retainer 103 is inserted into the retainer insertion hole 114 from the left side of the opening 115 (in FIG. 17) in the direction of arrow E. On a rear edge of the retainer 103 in the insertion direction E, an operation projection 118 is integrally provided with the rear edge. If the retainer 103 is inserted into the retainer insertion hole 114, the retainer 103 is held and the operation projection 118 extends outwardly from the opening 115. This is the temporarily secured position of the retainer 103, where the projection portion 117 of the retainer 103 is in front of the flexibly deformable spaces 110 of the lances 108.

Figure 22:
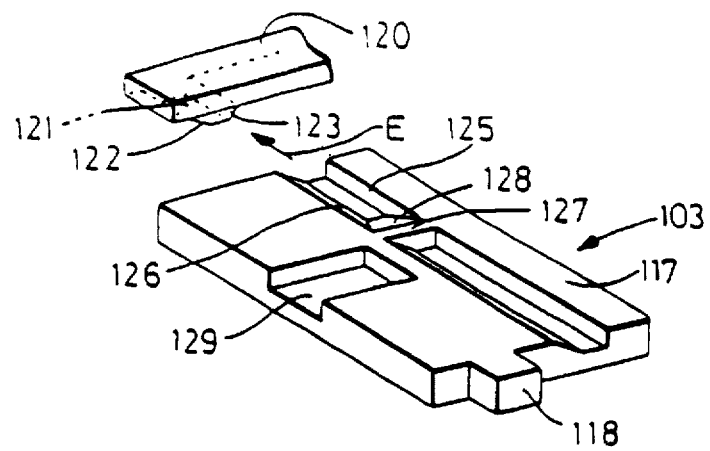
FIG. 22 is a perspective view of a retainer and a lock piece.
Figure 23:
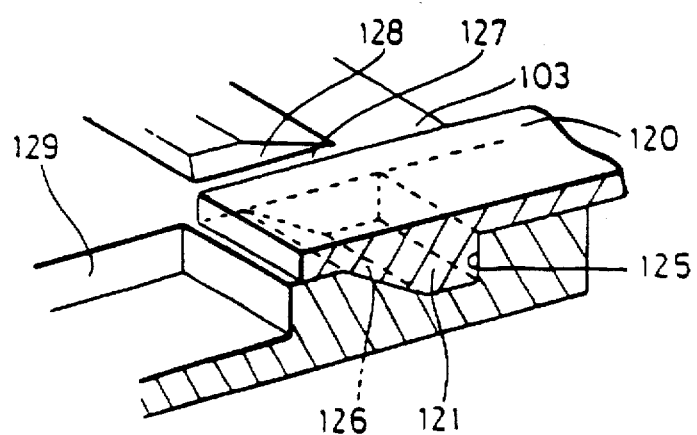
FIG. 23 is a partially cutaway perspective view of the retainer and lock piece, where the retainer is locked at a temporarily secured position.
Figure 24:
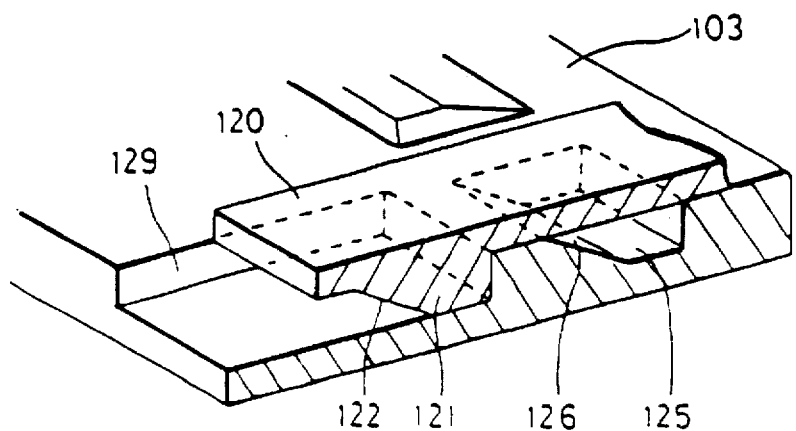
FIG. 24 is a partially cutaway perspective view of the retainer and lock piece, illustrating where the retainer is locked at a fully secured position.

In order to hold the retainer 103 in the temporarily secured position, the ceiling surface of the retainer insertion hole 114 is provided with a flexibly deformable lock piece 120. The lock piece 120 projects forwardly (the left side in FIG. 19) in a cantilever fashion. The lock piece 120 includes a lock projection 121 on its lower leading end portion and, as shown in FIG. 22, the front surface side of the lock projection 121 is formed as a tapered surface 122. The side surface of the lock projection 121 is also formed as a tapered surface 123.

A guide groove 125 is formed on the upper surface of the retainer 103 on the projection portion 117 side. The guide groove 125 extends along the insertion direction arrow E, in FIGS. 17 and 22. The lock projection 121 of the lock piece 120 can be fit in the guide groove 125. The side wall of the guide groove 125 is formed as a tapered surface 126 and corresponds to the tapered surface 122 of the lock projection 121. At the middle position of the guide groove 125 thereof, a securing portion 127 is provided. A front surface side of the securing portion 127 formed as a tapered surface 128 in the insertion direction E.

When the lock projection 121 is fit into the guide groove 125, the retainer 103 is inserted into the retainer insertion hole 114. During insertion, when the lock piece 120 is flexibly deformed, the lock projection 121 intersects with the securing portion 127 from the tapered surface 128. Thus, the retainer 103 butts against the opposite side wall of the male housing 101. When lock piece 120 is deformed and returns back to its original position, the lock projection 121 is fit with the rear surface side of the securing portion 127. Thereby, the retainer 103 is held in the temporarily secured position.

The retainer 103 after being held in the temporarily secured position, is then pushed in the direction of arrow F (FIG. 18), deeper into the retainer insertion hole 114. This position is the fully secured position, where projection portion 117 of the retainer 103 extends into the respective flexibly deformable space 110 of each lance 108, thereby restricting the flexible deformation of each lance 108.

As shown in FIG. 22, a securing groove 129 is formed in the upper surface of the retainer 103 to hold the retainer 103 in the fully secured position. The securing groove 129 extends at right angles to the guide groove 125. The lock projection 121 of the lock piece 120 fits into the securing groove 129. The securing groove 129 extends from a rear surface side of the securing portion 127 in the insertion direction E, and is spaced a given distance from the guide groove 125.

If the retainer 103 is pushed from the temporarily secured position, into the retainer insertion hole 114 in the direction of arrow F (FIG. 18) while the lock piece 120 is flexibly deformed, the lock projection 121 slides along the tapered surface 126 of the guide groove 125 onto the upper surface of the retainer 103. When the retainer 103 is pushed into the fully secured position, the lock piece 120 has been deformed and is returned back to its original position. The lock projection 121 is then fit into the securing groove 129. The retainer 103 is held in the fully secured position to prevent removal.

Next, a description of the operation of the third preferred embodiment of the invention structured will now be provided.

The retainer 103 is inserted from the left side (FIG. 17) of the opening 115 formed in the side surface of the male housing 101, and moved in the direction of arrow E into the retainer insertion hole 114. As shown by a solid line in FIG. 18 the broken line in FIG. 19, the retainer 103 is held in the temporarily secured position. In the temporarily secured position, the projection portion 117 of the retainer 103 is in front of the flexibly deformable spaces 110 of each of the lances 108, which are in a flexibly deformable condition. From this position, if the male terminal member 102 is inserted into the cavities 107, the lances 108 can be flexibly deformed. When the terminal 102 is moved to its fully inserted position, the lances 108 are elastically deformed and return to their original positions, where they fit within the jaw portion 111 of the male terminal member 102. Thus, that the retainer 103 is secured in a removal prevention manner.

Figure 18:
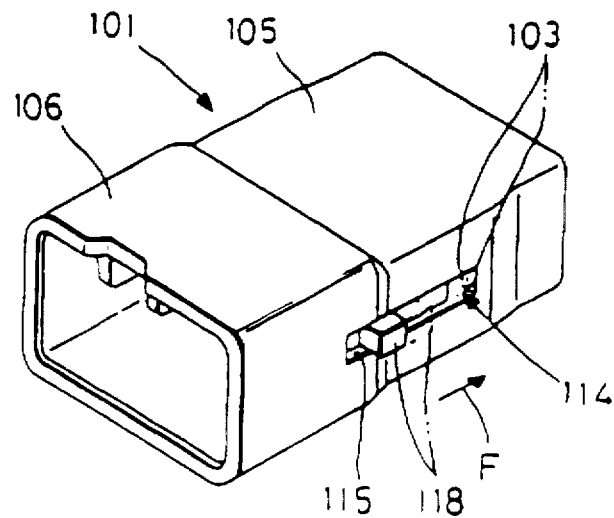
FIG. 18 is a perspective view of the third preferred embodiment, illustrating a retainer inserted to a temporarily secured position.

When a finger or other object is put on the operation projection 118, which projects from the opening 115, the retainer 103 can then be pushed into the retainer insertion hole in the direction of arrow F in FIG. 18. The retainer 103 is held in the fully secured position, is located further into the housing than the primarily securing position, as shown by the broken line in FIG. 18 and the solid line in FIG. 20. At this position, the projection portion 117 of the retainer 103 projects into the flexibly deformable spaces 110 of the lances 108, so flexible deformation of the lances 108 is restricted. This assures that the male terminal member 102 is retained against removal.

When the male terminal member 102 is inserted into the cavities 107, as shown in FIG. 21, and the metal member 102 can only be inserted to a half-insertion position because the lances 108 are flexed within the flexibly deformable spaces 110. Therefore, even if one tries to push the retainer 103 from the temporarily secured position to the fully secured position, the retainer 103 cannot be pushed in because it abuts against a lance 108. This indicates that the male terminal member 102 is in a half-insertion position.

As described above, since insertion of the retainer 103 into the temporarily secured position and the pushing of the retainer 103 into the fully secured position can be carried out from the side surface side of the male housing, without interference from obstacles, the mounting of the retainer 103 can be conducted with a very high efficiency. As there is no need to insert a hand, tool or the like into the hood 105 to move the retainer. Thus, the tab 112 of the male terminal member 102 will not be deformed.

Further, since the insertion direction of the retainer 103 toward the temporarily secured position and the pushing direction of the retainer 103 from the temporarily secured position to the fully secured position intersect each other at right angles, i.e., the directions are normal to each other, the retainer 103 cannot be erroneously pushed into the fully secured position. This eliminates a need for a complex operation to return the retainer 103. Thus, a retainer assembling operation can be efficiently conducted.

The invention is not limited to the above-described preferred embodiments described with reference to the accompanying drawings. For example, the following modifications also fall within the technical scope of the invention. Other modifications and changes than the following embodiments can also be included, without departing from the spirit of the invention.

In the first preferred embodiment, when the retainer 3 is inserted to the temporarily secured position, the rear edge of the retainer 3 in direction A passes through the opening 11 and is inserted into the female housing 1. Thus, the width of the opening 11 may allow the retainer 3 to be inserted into the temporarily secured position.

In the second preferred embodiment, when the retainer 53 is inserted into the temporarily secured position, the rear edge of the retainer 3 in the direction A passes through the opening 63, and is inserted into the male housing 51. When the retainer 53 is further pushed into the fully secured position, the retainer 53 can be pushed by a finger, jig or other tool from within the hood portion 55. The width of the opening 63 may have a length to allow the retainer 53 to be inserted into the temporarily secured position.

In the molding device, the retainer inserting pin may also be driven or advanced and retreated by use of any appropriate assembly, such as a cam mechanism.

Figure 25:
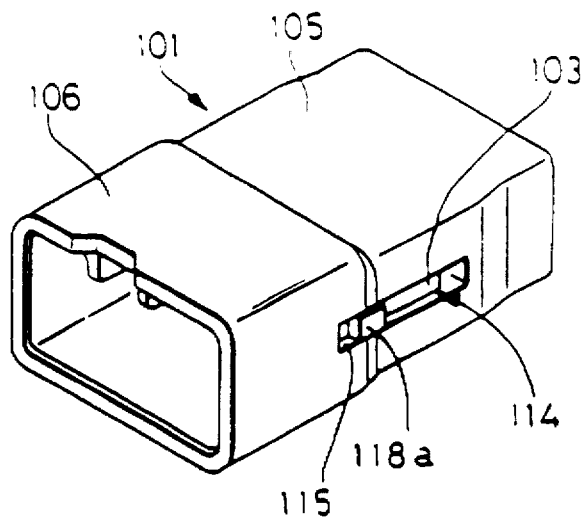
FIG. 25 is a perspective view of a modification of the third preferred embodiment, illustrating where the retainer is inserted to the temporarily secured position.
Figure 26:
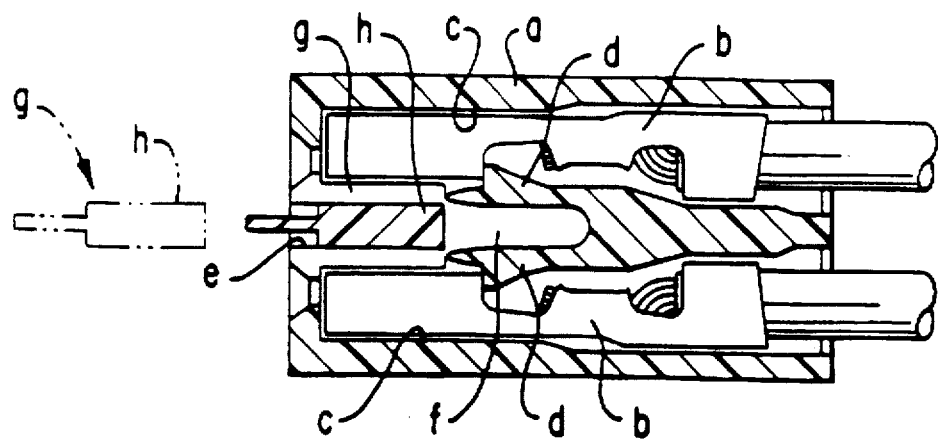
FIG. 26 is a longitudinal section view of a conventional connector, illustrating where a retainer is mounted at a temporarily secured position; and, FIG. 27 is a longitudinal section view of the above conventional connector, illustrating where the retainer is mounted at a fully secured position.
Figure 27:
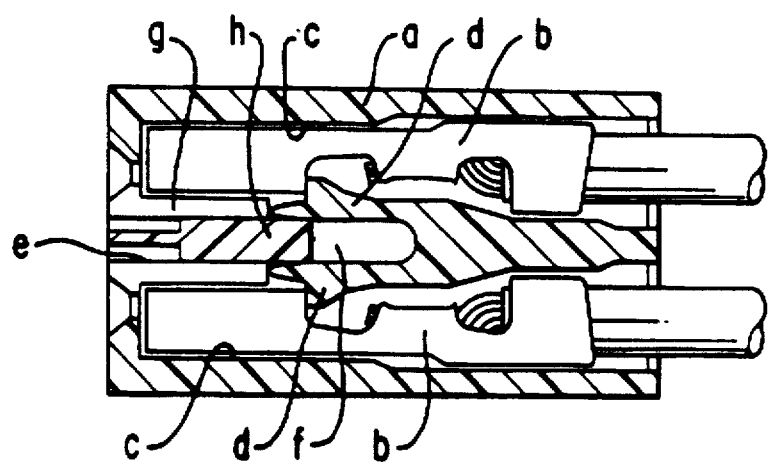

In the third preferred embodiment, when the retainer 103 is inserted into the temporarily secured position, the projection 118 projects from the opening 115. Alternatively, as shown in FIG. 25, an operation projection 118a can be formed at a similar level with the side surface of the male housing 101. When the retainer 103 is pushed into the fully secured position, a jig, such as a driver and the like, may be used. Due to the formation of the operation projection 118a with the side surface of the male housing 101, the outer appearance of the connector can be neat. Further, external objects cannot bump against the operation projection 118a causing improper operation. Further, as an alternative to the operation projection, a recessed portion may be formed to facilitate operation.

The invention is not limited to the connector of a front retainer-type, as described in the preferred embodiments. It can also be applied to other front retainer-type connectors. For example, by pushing a retainer into a fully secured position, an elastic securing piece, separate from the lances, can be provided to be brought into engagement with another portion of a terminal member to secure the terminal member. Further, the invention can also be applied similarly to a rear retainer-type connectors, by pushing a retainer from the rear surface side of a connector housing.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes amy be made without departing from the spirit and scope of the invention as defined in the following claims.

What is claimed is:

1. A connector, comprising:
   a connector housing comprising at least one cavity into which a terminal member can be inserted in a terminal insertion direction; and
   a retainer being movable in the connector housing between a temporarily secured position and a fully secured position, the retainer when in the fully secured position being able to secure the terminal member to prevent removal; wherein
   the connector housing includes a side surface having a retainer insertion hole, the retainer is insertable into the retainer insertion hole in a first direction to the temporarily secured position, whereby the retainer after being inserted into the retainer insertion hole and positioned at the temporarily secured position is moved in a second direction being different from the first direction in the connector housing from the temporarily secured position to the fully secured position, wherein the first direction is perpendicular to the terminal insertion direction while the second direction is opposite to the terminal insertion direction.

2. A connector according to claim 1, wherein the retainer is formed as a substantially flat plate.

3. A connector according to claim 1, the retainer further comprising a securing groove extending along the retainer in a direction substantially parallel to the second direction.

4. A connector according to claim 1, wherein the housing is a female connector housing and each terminal is a female terminal.

5. A connector according to claim 1, the connector housing further comprising a flexibly deformable lance disposed in each cavity.

6. A connector according to claim 5, wherein each lance is cantilevered.

7. A connector according to claim 5, wherein each lance is flexibly deformed when a terminal is inserted into a respective cavity, the lance entering into an opening in each terminal when the terminal is in its fully inserted position.

8. A connector according to claim 5, wherein the lance prevents insertion of the retainer unless each terminal is in its fully inserted position.

9. A connector according to claim 1, the retainer further comprising a guide groove extending across the retainer in a direction substantially parallel to the first direction.

10. A connector according to claim 9, the guide groove comprising a securing portion formed intermediate ends of the guide groove, the guide groove further comprising at least one tapering surface formed on the securing portion.

11. A connector according to claim 9, the retainer further comprising a securing groove extending along the retainer in a direction substantially parallel to the second direction, wherein the first and second directions are substantially orthogonal.

12. A connector according to claim 10, wherein the connector housing further includes a locking portion, the locking portion being inserted within the guide groove when the retainer is moved in the first direction and the locking portion fitting within the securing groove when the retainer is moved in the second direction.

13. A connector, comprising:
   a connector housing including a plurality of cavities formed in an interior of the connector housing into which a terminal member can be inserted in a terminal insertion direction, and a retainer mountable into the connector housing in a first direction and being movable between a temporarily secured position and a fully secured position in a second direction of a terminal member, wherein the first and second directions are different from one another and the first direction is perpendicular to the terminal insertion direction while the second direction is opposite to the terminal insertion direction wherein the retainer, when in the fully secured position, secures the terminal member in the connector housing, the connector housing further comprising a retainer insertion hole formed in a side surface, the retainer can be inserted in the retainer insertion hole to be moved between the temporarily secured position and the fully secured position, the retainer being insertable into the temporarily secured position, and then pushed into the fully secured position from the side surface side of the connector housing.

14. A connector according to claim 13, wherein each lance is flexibly deformed when a terminal is inserted into a respective cavity, the lance entering into an opening in each terminal when the terminal is in its fully inserted position.

15. A connector according to claim 13, the retainer further comprising a securing groove extending along the retainer in a direction substantially parallel to the second direction.

16. A connector according to claim 13, wherein the housing is a female connector housing and each terminal is a female terminal.

17. A connector according to claim 13, the connector housing further comprising a flexibly deformable lance disposed in each cavity.

18. A connector according to claim 17, wherein each lance is cantilevered.

19. A connector according to claim 17, wherein the lance prevents insertion of the retainer unless each terminal is in its fully inserted position.

20. A connector according to claim 13, the retainer further comprising a guide groove extending across the retainer in a direction substantially parallel to the first direction.

21. A connector according to claim 20, the guide groove comprising a securing portion formed intermediate ends of the guide groove, the guide groove further comprising at least one tapering surface formed on the securing portion.

22. A connector according to claim 13, wherein the retainer is formed as a substantially flat plate.

23. A connector according to claim 22, the retainer further comprising a securing groove extending along the retainer in a direction substantially parallel to the second direction, wherein the first and second directions are substantially orthogonal.

24. A connector according to claim 23, wherein the connector housing further includes a locking portion, the locking portion being inserted within the guide groove when the retainer is moved in the first direction and the locking portion fitting within the securing groove when the retainer is moved in the second direction.

* * * * *